United States Patent
Zhang et al.

(10) Patent No.: US 11,321,122 B2
(45) Date of Patent: May 3, 2022

(54) METHOD, APPARATUS, DEVICE AND MEDIUM FOR PROCESSING TOPOLOGICAL RELATION OF TASKS

(71) Applicant: BAIDU ONLINE NETWORK TECHNOLOGY (BEIJING) CO., LTD., Beijing (CN)

(72) Inventors: Chao Zhang, Beijing (CN); Zhuo Chen, Beijing (CN); Liming Xia, Beijing (CN); Weifeng Yao, Beijing (CN); Jiankang Xin, Beijing (CN); Chengliang Deng, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 317 days.

(21) Appl. No.: 16/553,852

(22) Filed: Aug. 28, 2019

(65) Prior Publication Data
US 2020/0073712 A1 Mar. 5, 2020

(30) Foreign Application Priority Data
Aug. 30, 2018 (CN) .......................... 201811004352.9

(51) Int. Cl.
*G06F 9/46* (2006.01)
*G06F 8/00* (2018.01)
(Continued)

(52) U.S. Cl.
CPC .............. *G06F 9/4881* (2013.01); *G06F 9/34* (2013.01); *G06F 9/3838* (2013.01); *G06F 9/544* (2013.01); *G06F 8/457* (2013.01)

(58) Field of Classification Search
CPC ........ G06F 9/4881; G06F 9/34; G06F 9/3838; G06F 9/544; G06F 9/3836; G06F 9/52;
(Continued)

(56) References Cited

U.S. PATENT DOCUMENTS 5,996,060 A * 11/1999 Mendelson ............. G06F 9/383
712/205
2008/0271035 A1 * 10/2008 Yasukawa ............. G06F 1/3237
718/104
(Continued)

FOREIGN PATENT DOCUMENTS

CN    102298681 A    12/2011
CN    104123184 A    10/2014
(Continued)

OTHER PUBLICATIONS

Vaidya, Vinay G et al. "Optimal Task Scheduler for Multi-core Processor" IEEE, 2010 (Year: 2010).*
(Continued)

*Primary Examiner* — Daniel H Pan
(74) *Attorney, Agent, or Firm* — Lathrop GPM LLP (57) ABSTRACT

The embodiments of the present disclosure provide a method, an apparatus, a device and a medium for processing topological relation of tasks. The method includes: extracting at least one execution element from each of processing tasks based on a topological relation recognition rule; determining a dependency relation among the processing tasks according to content of the execution element of each processing task; and determining a topological relation among the processing tasks according to the dependency relation among the processing tasks.

18 Claims, 2 Drawing Sheets

(51) Int. Cl.
*G06F 9/48* (2006.01)
*G06F 9/34* (2018.01)
*G06F 9/54* (2006.01)
*G06F 9/38* (2018.01)
*G06F 8/41* (2018.01)

(58) Field of Classification Search
CPC ........ G06F 9/4843; G06F 9/48; G06F 9/4806; G06F 9/485; G06F 8/457; G06F 8/458; G06F 8/445; G06F 8/4451; G06F 8/443
USPC .......... 718/102–108; 712/227, 245; 717/132, 717/133, 151–161
See application file for complete search history.

(56) References Cited

U.S. PATENT DOCUMENTS

2011/0078417 A1* 3/2011 Fahs ................... G06F 9/30087
712/216
2014/0165077 A1* 6/2014 Martinez Canedo ... G06F 8/456
718/105
2014/0317385 A1* 10/2014 Vanderspek .......... G06F 8/4441
712/216

FOREIGN PATENT DOCUMENTS

| | | |
|---|---|---|
| CN | 104240166 A | 12/2014 |
| CN | 106648859 A | 5/2017 |
| CN | 106681808 A | 5/2017 |
| CN | 106682096 A | 5/2017 |
| CN | 106682097 A | 5/2017 |
| CN | 106682099 A | 5/2017 |
| CN | 106708965 A | 5/2017 |

OTHER PUBLICATIONS

Chinese Patent Application No. 201811004352.9 First Office Action dated Apr. 26, 2020, 9 pages.
Chinese Patent Application No. 201811004352.9 English translation of First Office Action dated Apr. 26, 2020, 10 pages.

* cited by examiner

METHOD, APPARATUS, DEVICE AND MEDIUM FOR PROCESSING TOPOLOGICAL RELATION OF TASKS

CROSS-REFERENCE TO RELATED APPLICATION

This application claims priority to and benefits of Chinese Patent Application Serial No. 201811004352.9, filed with the State Intellectual Property Office of P. R. China on Aug. 30, 2018, the entire content of which is incorporated herein by reference.

TECHNICAL FIELD

The present disclosure relates to a field of computer task processing techniques, and more particularly, to a method, an apparatus, a device and a medium for processing topological relation of tasks.

BACKGROUND

Currently, unmanned vehicle system is an important application area of artificial intelligence. In the unmanned vehicle system, a plurality of functional modules of different functions are running, and each functional module is implemented by a program, with or without cooperative hardware devices. Typical functional modules are, for example, driver modules, perception modules, planning modules, and the like. Different unmanned vehicle systems may be provided with different functional modules due to differently configured hardware devices or different software functions.

In the related art, each functional module has a corresponding processing task, and each processing task is responsible for processing various types of data generated in real time. For example, the perception task corresponding to the perception module may process the collected perception data when the collected perception data is received in real time. Data interaction is required among the respective processing tasks. For example, the route data output by the planning task of the planning module may be provided the driving tasks of the driver module for realizing driving control.

Data interaction relation among the processing tasks results in a dependency relation among the processing tasks, thus the tasks must be processed serially. In order to speed up the processing, parallel processing may be performed on processing tasks without dependencies. Therefore, there is a topological relation among processing tasks, for example, serial or parallel relation, which can be represented by a topological diagram. The topological relation among the processing tasks may change, when the processing tasks included in the unmanned vehicle system are different, or because of the addition of a new processing task, the deletion and update of an original processing task.

SUMMARY

Embodiments of the present disclosure provide a method for processing topological relation of tasks. The method includes: extracting at least one execution element from each of processing tasks based on a topological relation recognition rule; determining a dependency relation among the processing tasks according to content of the execution element of each processing task; and determining a topological relation of the processing tasks according to the dependency relation among the processing tasks.

Embodiments of the present disclosure provide a device for processing topological relation of the tasks. The device includes: an extracting module, configured to extract at least one execution element from each of processing tasks based on a topological relation recognition rule; a first determining module, configured to determine a dependency relation among the processing tasks according to content of the execution element of each processing task; and a second determining module, configured to determine a topological relation of the processing tasks according to the dependency relation of the processing tasks.

Embodiments of the present disclosure provide an electronic device, including:
one or more processors;
a memory, configured to store one or more programs; and
when the one or more programs are executed by the one or more processors, the one or more processors are caused to implement the method for processing topological relation of tasks as described by any of the embodiments.

Embodiments of the present disclosure provide a computer readable storage medium having computer programs stored thereon, wherein when the programs are executed by a processor, the method for processing topological relation of tasks as described by any of the embodiments.

DETAILED DESCRIPTION

The present disclosure will be further described in detail below with reference to the accompanying drawings and embodiments. It is understood that the detailed embodiments described herein are merely intended to explain the present disclosure and are not intended to limit the present disclosure. It should also be noted that, for ease of description, only some, but not all, of the structures related to the present disclosure are shown in the accompanying drawings.

The technical solution of the embodiments of the present disclosure is applicable to the topological relation recognition and processing in an unmanned vehicle system. However, it can be understood that it can also be applied in other scenarios, for example, in processing topological relation of tasks corresponding to a plurality of functional modules.

Topology is to abstract entities into points that are independent of their size and shape, and to abstract the lines connecting the entities into lines, and then to represent the relation between these points and "lines" in a form of graph, for the purpose of studying the connection between these points and lines.

At present, the topological relation of the processing tasks of the unmanned vehicle system is various, and the topological relation of one processing task set is not unique. In the related art, the topological relation is first determined for each group of processing task sets, and then the topological relation is loaded to the unmanned vehicle system for execution, the performance of the topological relation is determined by testing based on actual scenario, which is time consuming and laborious and is not automated.

Thus embodiments of the present disclosure provide a method, an apparatus, a device and a medium for processing topological relation of tasks.

Figure 1:
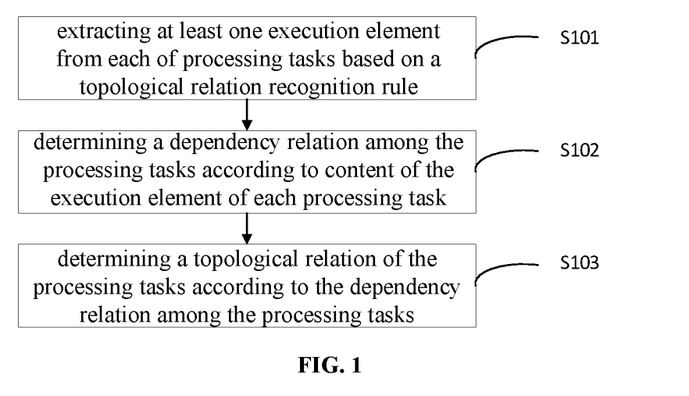
FIG. 1 is a flowchart of a method for processing topological relation of tasks according to an embodiment of the present disclosure.

FIG. 1 is a flowchart of a method for processing topological relation of tasks according to an embodiment of the present disclosure. This embodiment is applicable to a case of determining a topological relation for processing tasks of an unmanned vehicle system. The method may be executed by a device for processing topological relation of the tasks. The device may be implemented by software and/or hardware, and may be configured in an electronic device that processes various topological relations, such as an unmanned vehicle. In detail, the method includes the following.

At block S101, at least one execution element is extracted from each of processing tasks based on a topological relation recognition rule.

The execution element is an element in execution of a processing task and can be used to describe a key node in the execution of the processing task. When the topological relations that need to be recognized are different, contents of execution elements that need to be extracted are also different. For example, when the topological relation depends on a data transmission direction, the topological relation recognition rule specifies how to extract an instruction related to data transmission as an execution element. For example, an execution element includes at least one of: a read instruction, a write instruction, a merging instruction and channel information. The read instruction indicates that the processing task reads data from a certain information channel. The write command indicates that the processing task writes data to a certain information channel. The merging instruction indicates that the processing task reads data from two or more information channels for merging. The channel information indicates a storage location of the data. For example, the channel information may be an address in a shared storage space.

In detail, the device for processing topological relation of tasks selects processing tasks that conform to the topological relation recognition rule, and extracts one or more of a read instruction, a write instruction, a merging instruction and channel information from each processing task.

Alternatively, when the topological relation of the processing tasks depends on other factors, other topological relation recognition rules and execution elements may be set. For example, the topological relation depends on a priority and a time sequence, thus execution elements required by the recognition can be correspondingly set.

At block S102, a dependency relation among the processing tasks is determined according to content of the execution element of each processing task.

The dependency relation refers to an associated relation between at least two processing tasks.

In detail, a processing task A needs to read data from a certain channel information, and a processing task B writes data to the channel information, thus it can be considered that the processing task A depends on the processing task B.

At block S103, a topological relation of the processing tasks is determined according to the dependency relation among the processing tasks.

The topological relation refers to an associated relation among a plurality of processing tasks. The associated relation may be directed or undirected.

In detail, according to a data transfer relation between each of two or more processing tasks and one information channel, the dependency relation among the processing tasks is determined, and the topological relation among the processing tasks is further determined.

With the embodiments of the present disclosure, the execution element is extracted from the processing tasks, based on which the dependency relation among processing tasks is determined, and the topological relation of the processing tasks is determined according to the dependency relation. In this way, the problem in the relate art caused by manually determining the topological relation among the processing tasks, then loading the topological relation to the unmanned vehicle system for execution, and finally determining the performance of the topological relation by testing based on actual scenario may be solved, and an effect of automatically determining the dependency relation between the processing tasks by the unmanned vehicle system and automatically generating the topological relation among the processing tasks according to the dependency relation is achieved.

Figure 2:
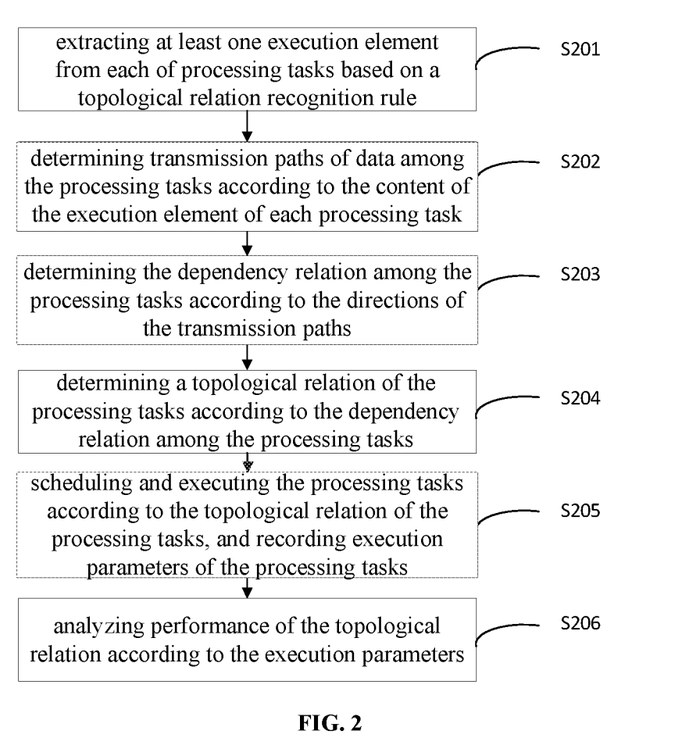
FIG. 2 is a flowchart of a method for processing topological relation of tasks according to an embodiment of the present disclosure.

FIG. 2 is a flowchart of a method for processing topological relation of tasks according to an embodiment of the present disclosure. This embodiment is refined on the basis of above embodiment illustrated in FIG. 1, and how to determine the data transmission path among the processing tasks is described in detail. Alternatively, introduction of analyzing the performance of the topological relation by recording execution parameters of the processing tasks is further made. The process is described in detail as follows.

At block S201, at least one execution element is extracted from each of processing tasks based on a topological relation recognition rule.

At block S202, transmission paths of data among the processing tasks are determined based on the content of the execution element of each processing task.

The transmission path refers to a path through which data is transferred from one processing task to another.

In detail, a read instruction is acquired from an execution element of a first processing task, and source channel information of a read source corresponding to the read instruction is acquired and recorded. A write instruction is acquired from an execution element of a second processing task, and destination channel information of a write destination corresponding to the write instruction is acquired and recorded. The recorded source channel information is matched with the destination channel information. For a matched channel information group, i.e., the recorded source channel information matches with the destination channel information, it is determined that the transmission path of the data is from the second processing task to the first processing task.

Alternatively, for the matched channel information group, it may be determined that the transmission path of data is from a plurality of first processing tasks to the second processing task, or it may be determined that the transmission path of data is from the first processing task to a plurality of the second processing tasks. In other words, the method includes follows.

A merge instruction is acquired from an execution element of a third processing task, and source channel information of at least two read sources corresponding to the merge instruction is acquired and recorded.

A write instruction is acquired from an execution element of a fourth processing task, and destination channel information corresponding to the write instruction is acquired and recorded.

The recorded source channel information is matched with the destination channel information.

For a matched channel information group, i.e., the recorded source channel information matches with the destination channel information, it is determined that the transmission path of data is from the fourth processing task to the third processing task.

At block S203, a dependency relation among the processing tasks is determined according to the directions of the transmission paths.

A direction of a transmission path indicates a data flow direction relation among the processing tasks.

In detail, according to the data flow direction relation among the processing tasks, the association between two processing tasks is confirmed, and a dependency relation is formed.

At block S204, a topological relation of the processing tasks is determined according to the dependency relation among the processing tasks.

On the basis of determining the topological relation, a scheduling program for scheduling the execution of the processing tasks can be automatically generated according to the topological relation. The scheduling program is loaded to the electronic device to run. The scheduling program can be executed in an actual environment or be tested first. Due to different topological relations or uncertain factors existing for one set of processing tasks, a performance testing is usually performed before actual use.

At block S205, processing tasks are scheduled and executed according to the topological relation of the processing tasks, and execution parameters of the processing tasks are recorded.

The processing task may be scheduled and executed based on a virtual testing system of a real scene database, so that each processing task in the unmanned vehicle system is scheduled to be executed. The data in the real scene database, simulating a real scene, is taken as an input data to sequentially trigger the execution of respective processing tasks to test the performance of the system when scheduling the processing tasks according to the topological relation. The performance reflected by the execution parameters can be various, for example, response speed, accuracy, real-time and the like.

Taking the response speed as an example for explanation, the execution parameter may reflect s execution time period of the processing task. For example, the execution parameter may be a duration between a startup time of an initial task node and an end time of a termination task node during execution process. This may reflect the overall performance of the topological relation. The execution parameter may also be a transmission delay between a write time point of writing data to a channel space and a read time point of reading the data from the channel space among serial processing tasks in the execution process. This may reflect the response performance of a certain processing link. In detail, the write time point and the read time point of any data may be collected from log data to calculate the time delay. If the time delay is long, it may indicate that the topological relation setting makes the intermediate link have more processing tasks in, delaying the reading of the data.

At block S206, performance of the topological relation is analyzed according to the execution parameter.

In detail, by collecting execution parameters of each processing task generated by the virtual test system of different real scene databases in the unmanned vehicle system, it is determined whether the execution parameters of the current topological relation meet the actual application requirements, the execution parameters that can be optimized is analyzed, and the processing tasks or overall topological relation related to the execution parameter are optimized. The various execution parameters may not necessarily show same tendency, and finally the advantages and disadvantages of the topological relation can be comprehensively analyzed.

With the embodiments of the present disclosure, the execution element is extracted from the processing tasks, based on which the dependency relation among processing tasks is determined, and the topological relation of the processing tasks is determined according to the dependency relation. In this way, the problem in the relate art caused by manually determining the topological relation among the processing tasks, then loading the topological relation to the unmanned vehicle system for execution, and finally determining the performance of the topological relation by testing based on actual scenario may be solved, and an effect of automatically determining the dependency relation between the processing tasks by the unmanned vehicle system and automatically generating the topological relation among the processing tasks according to the dependency relation is achieved. Meanwhile, in this embodiment, by providing a technical solution of analyzing the performance of the topological relation by recording the execution parameters of the processing tasks, a direction for optimizing the performance of the unmanned vehicle system is provided, which is beneficial to the optimization of the processing tasks of the unmanned vehicle system.

Figure 3:
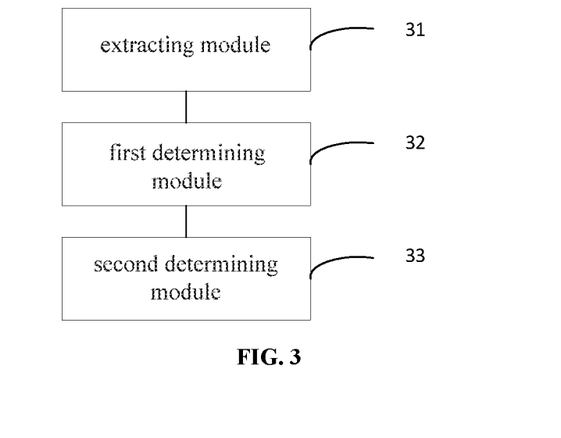
FIG. 3 is a structural diagram of a device for processing topological relation of tasks according to an embodiment of the present disclosure.

FIG. 3 is a structural diagram of a device for processing topological relation of tasks according to an embodiment of the present disclosure. The device includes: an extracting module 31, a first determining module 32, and a second determining module 33.

The extracting module 31 is configured to extract at least one execution element from each of processing tasks based on a topological relation recognition rule.

The first determining module 32 is configured to determine a dependency relation among the processing tasks according to content of the execution element of each processing task.

The second determining module 33 is configured to determine a topological relation of the processing tasks according to the dependency relation of the processing tasks.

With the embodiments of the present disclosure, the execution element is extracted from the processing tasks, based on which the dependency relation among processing tasks is determined, and the topological relation of the processing tasks is determined according to the dependency relation. In this way, the problem in the relate art caused by manually determining the topological relation among the processing tasks, then loading the topological relation to the unmanned vehicle system for execution, and finally determining the performance of the topological relation by testing based on actual scenario may be solved, and an effect of automatically determining the dependency relation between the processing tasks by the unmanned vehicle system and automatically generating the topological relation among the processing tasks according to the dependency relation is achieved.

On the basis of the above embodiments, the first determining module is further configured to:

determine transmission paths of data among processing tasks according to a content of an execution element of each processing task; and determine the dependency relation among the processing tasks according to the direction of the transmission paths.

On the basis of the above embodiments, the execution element includes at least one of: a read instruction, a write instruction, a merging instruction and channel information.

On the basis of the above embodiments, the channel information is an address in a shared storage space.

On the basis of the above embodiments, determining the transmission paths of data among the processing tasks according to the content of the execution element of each processing task, includes:

acquiring a read instruction from an execution element of a first processing task, acquiring source channel information of a read source corresponding to the read instruction, and recording the source channel information;

acquiring a write instruction from an execution element of a second processing task, acquiring the destination channel information of a write destination corresponding to the write instruction, and recording the destination channel information;

matching the recorded source channel information with the destination channel information; and in response to determining that the recorded source channel information matches with the destination channel information, determining that the transmission path of data is from the first processing task to the second processing task.

On the basis of the above embodiments, determining the transmission paths of data among the processing tasks according to the content of the execution element of each processing task, includes:

acquiring a merge instruction from an execution element of a third processing task, and acquiring source channel information of at least two read sources corresponding to the merge instruction, and recording the source channel information;

acquiring a write instruction from an execution element of a fourth processing task, and acquiring write target destination channel information of a write destination corresponding to the write instruction, and recording the destination channel information;

matching the recorded source channel information with the target destination channel information; and in response to determining that the recorded source channel information matches with the destination channel information, determining that the transmission path of data is from the fourth processing task to the third processing task.

On the basis of the above embodiments, the device further includes an execution parameter recording module, configured to: schedule and execute the processing tasks according to the topological relation of the processing tasks, and record execution parameters of the processing task.

On the basis of the above embodiments, the device further includes a performance analysis module configured to analyze performance of the topological relation according to the execution parameters.

On the basis of the above embodiments, the execution element recording module is further configured to acquire a duration between a startup time of an initial task node and an end time of a termination task node during executing process of the processing tasks as an execution parameter, and acquire, during the executing process, an transmission delay between a write time point of writing data to a channel space and a read time point of reading the data from the channel space among serial processing tasks, and take the transmission delay as an execution parameter.

The device for processing topological relation of tasks provided in this embodiment may be used to perform a method for processing topological relation of tasks provided by any of the foregoing embodiments, with corresponding functions and beneficial effects.

Figure 4:
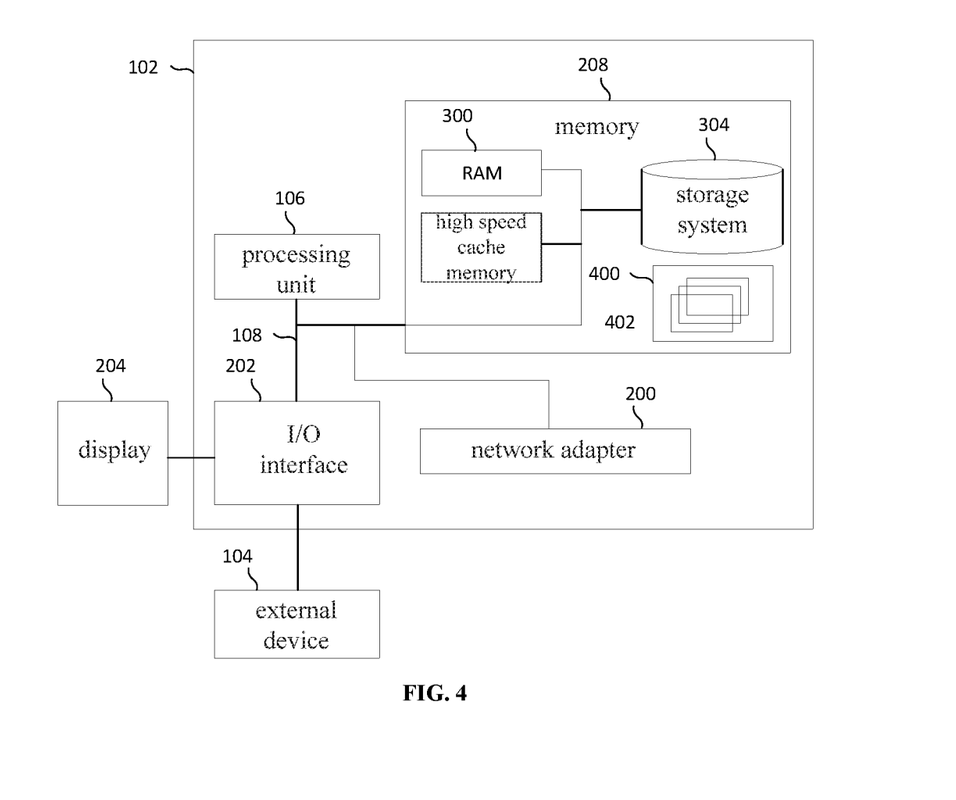
FIG. 4 is a schematic diagram illustrating structure of an electronic device according to an embodiment of the present disclosure.

FIG. 4 is a schematic structural diagram of an electronic device according to an embodiment of the present disclosure. FIG. 4 illustrates a block diagram of an exemplary device 102 suitable for use in implementing embodiments of the present disclosure. The device 102 illustrated in FIG. 4 is merely an example and should not impose any limitation on the function and scope of use of the embodiments of the present disclosure. Alternatively, the device can be an in-vehicle control device, such as an in-vehicle controller on an unmanned vehicle.

As shown in FIG. 4, the device 102 is represented in a form of a general purpose computing device. Components of the device 102 may include, but are not limited to, one or more processors or processing units 106, a system memory 208, and a bus 108 that connects different system components, including the system memory 208 and the processing unit 106.

The bus 108 represents one or more of several types of bus structures, including a memory bus or a memory controller, a peripheral bus, a graphics acceleration port, a processor, or a local bus using any of a variety of bus structures. For example, these architectures include, but are not limited to, the industry standard architecture (ISA) bus, the micro channel architecture (MCA) bus, the enhanced ISA bus, and the video electronics standards association (VESA) local bus and a peripheral component interconnect (PCI) bus.

The device 102 typically includes a variety of computer system readable mediums. These medium can be any available medium that can be accessed by the device 102, including both volatile and nonvolatile mediums, removable and non-removable mediums.

The system memory 208 can include computer system readable medium in the form of volatile memory, such as random access memory (RAM) 300 and/or cache memory 302. The device 102 may further include other removable/non-removable, volatile/non-volatile computer system storage medium. By way of example only, the storage system 304 can be used to read from and write to the non-removable, non-volatile magnetic medium (not shown in FIG. 4, commonly referred to as a "hard disk drive"). Although not shown in FIG. 4, a magnetic disk drive for reading from and writing to a removable non-volatile disk (such as a "floppy disk"), and a removable non-volatile optical disk (such as a compact disk read only memory (CD-ROM), a digital video disc-read only memory (DVD-ROM) or other optical mediums) may be provided. In these cases, each drive can be coupled to the bus 108 via one or more data medium interfaces. The system memory 208 can include at least one program product having a set (e.g., at least one) of program modules, and these program modules are configured to perform the functions of various embodiments of the present disclosure.

The program/utility tool 400 having a set (at least one) of program modules 402, may be stored, for example, in the system memory 208. Such program modules 402 include, but are not limited to, an operating system, one or more applications, other program modules, and program data. Each or any combination of these examples may include an implementation of a networking environment. The program module 402 typically performs the functions and/or methods of the described embodiments of the present disclosure.

The device 102 can also communicate with one or more external devices 104 (e.g., a keyboard, a pointing device, and a display 204), and can also communicate with one or more devices that enable a user to interact with the device 102, and/or communicate with any device (e.g., a network card, and a modem) that enables the device 102 to communicate with one or more other computing devices. This communication can take place via an input/output (I/O) interface 202. Moreover, the device 102 can also communicate with one or more networks (e.g., a local area network (LAN), a wide area network (WAN), and/or a public network, such as the Internet) through a network adapter 200. As shown in FIG. 4, the network adapter 200 communicates with other modules of the device 102 via the bus 108. It should be understood that although not shown in FIG. 4, other hardware and/or software modules may be utilized in combination with the device 102, including but not limited to: microcode, device drivers, redundant processing units, external disk drive arrays, redundant arrays of independent disks (RAID) systems, tape drives, and data backup storage systems.

The processing unit 106 executes various functional applications and data processing by running a program stored in the system memory 208, for example, implementing a method for processing topological relation of tasks provided by the above-described embodiments of the present disclosure.

Embodiments of the present disclosure provide a computer readable storage medium having computer programs stored thereon. When the programs are executed by a processor, the method for processing topological relation of tasks according to any of embodiments of the present disclosure is implemented.

The method includes: extracting at least one execution element from each of processing tasks based on a topological relation recognition rule;

determining a dependency relation among the processing tasks according to content of the execution element of each processing task; and determining a topological relation of the processing tasks according to the dependency relation among the processing tasks.

The above computer readable storage medium in embodiments of the present disclosure may adopt any combination of one or more computer readable mediums. The computer readable medium may be a computer readable signal medium or a computer readable storage medium. The computer readable storage medium may be, but is not limited to, for example, an electrical, magnetic, optical, electromagnetic, infrared, or semiconductor system, apparatus, device, component or any combination thereof. A specific example of the computer readable storage medium (a non-exhaustive list) includes: an electrical connection having one or more wires, a portable computer disk, a hard disk, a random access memory (RAM), a read only memory (ROM), an erasable programmable read only memory (EPROM) or a flash memory, an optical fiber, a compact disc read-only memory (CD-ROM), an optical memory component, a magnetic memory component, or any suitable combination thereof. In the context, the computer readable storage medium may be any tangible medium including or storing programs. The programs may be used by or in conjunction with an instruction executed system, apparatus or device.

A computer readable signal medium may include a data signal that is transmitted in the baseband or as part of a carrier, carrying computer readable program code. Such transmitted data signals can employ a variety of forms including, but not limited to, electromagnetic signals, optical signals, or any suitable combination of the above. The computer readable signal medium can also be any computer readable medium other than a computer readable storage medium, which can transmit, propagate, or transport a program configured to be used by or in combination with the instruction execution system, apparatus, or device.

Program code embodied on a computer readable medium can be transmitted by any suitable medium, including but not limited to wireless, wire, optical cable, radio frequency (RF), and the like, or any suitable combination of the above.

The computer program codes for executing operations of the present disclosure may be programmed using one or more programming languages or the combination thereof. The programming languages include object-oriented programming languages, such as Java, Smalltalk, C++, and further include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet Service Provider).

It should be noted that, the above is only the preferred embodiments of the present disclosure and the technical principles applied thereto. Those skilled in the art will appreciate that the present disclosure is not limited to the specific embodiments described herein, and that various modifications, changes and substitutions may be made without departing from the scope of the disclosure. Therefore, the present disclosure has been described in detail by the above embodiments, but the present disclosure is not limited to the above embodiments, and other equivalent embodiments may be included without departing from the inventive concept. The scope is determined by the scope of the appended claims.

What is claimed is:

1. A method for processing topological relation of tasks, comprising:

extracting at least one execution element from each of processing tasks based on a topological relation recognition rule;

determining a dependency relation among the processing tasks according to content of the execution element of each processing task; and determining a topological relation of the processing tasks according to the dependency relation among the processing tasks, wherein determining the transmission paths of data among the processing tasks according to the content of the execution element of each processing task, comprises:

acquiring a read instruction from an execution element of a first processing task, acquiring source channel information of a read source corresponding to the read instruction, and recording the source channel information;

acquiring a write instruction from an execution element of a second processing task, acquiring destination channel information of a write destination corresponding to the write instruction, and recording the destination channel information;

matching the recorded source channel information with the destination channel information; and in response to determining that the recorded source channel information matches with the destination channel information, determining that the transmission path of data is from the second processing task to the first processing task.

2. The method according to claim 1, wherein determining the dependency relation among the processing tasks according to the content of the execution element of each processing task, comprises:
  determining transmission paths of data among the processing tasks according to the content of the execution element of each processing task; and
  determining the dependency relation among the processing tasks according to the directions of the transmission paths.

3. The method according to claim 1, wherein the execution element comprises at least one of: a read instruction, a write instruction, a merging instruction and channel information.

4. The method according to claim 3, wherein the channel information is an address in a shared storage space.

5. The method according to claim 1, wherein determining the transmission paths of data among the processing tasks according to the content of the execution element of each processing task, comprises:
  acquiring a merge instruction from an execution element of a third processing task, and acquiring source channel information of at least two read sources corresponding to the merge instruction, and recording the source channel information;
  acquiring a write instruction from an execution element of a fourth processing task, and acquiring destination channel information of corresponding to the write instruction, and recording the destination channel information;
  matching the recorded source channel information with the destination channel information; and
  in response to determining that the recorded source channel information matches with the destination channel information, determining that the transmission path of data is from the fourth processing task to the third processing task.

6. The method according to claim 1, after determining the topological relation of the processing tasks, further comprising:
  scheduling and executing the processing tasks according to the topological relation of the processing tasks, and recording execution parameters of the processing tasks; and
  analyzing performance of the topological relation according to the execution parameters.

7. The method according to claim 6, wherein recording the execution parameters of the processing tasks comprises at least one of:
  acquiring a duration between a startup time of an initial task node and an end time of a termination task node during executing process of the processing tasks as an execution parameter; and
  during the executing process, acquiring a transmission delay between a write time point of writing data to a channel space and a read time point of reading the data from the channel space among serial processing tasks, and taking the transmission delay as an execution parameter.

8. An electronic device, comprising:
  one or more processors;
  a memory, configured to store one or more programs, wherein,
  when the one or more programs are executed by the one or more processors, the one or more processors are caused to process topological relation of tasks, comprising:
    extracting at least one execution element from each of processing tasks based on a topological relation recognition rule;
    determining a dependency relation among the processing tasks according to content of the execution element of each processing task; and
    determining a topological relation of the processing tasks according to the dependency relation among the processing tasks,
    wherein determining the transmission paths of data among the processing tasks according to the content of the execution element of each processing task, comprises:
    acquiring a read instruction from an execution element of a first processing task, acquiring source channel information of a read source corresponding to the read instruction, and recording the source channel information;
    acquiring a write instruction from an execution element of a second processing task, acquiring destination channel information of a write destination corresponding to the write instruction, and recording the destination channel information;
    matching the recorded source channel information with the destination channel information; and
    in response to determining that the recorded source channel information matches with the destination channel information, determining that the transmission path of data is from the second processing task to the first processing task.

9. The electronic device according to claim 8, wherein determining the dependency relation among the processing tasks according to the content of the execution element of each processing task, comprises:
  determining transmission paths of data among the processing tasks according to the content of the execution element of each processing task; and
  determining the dependency relation among the processing tasks according to the directions of the transmission paths.

10. The electronic device according to claim 8, wherein the execution element comprises at least one of: a read instruction, a write instruction, a merging instruction and channel information.

11. The electronic device according to claim 10, wherein the channel information is an address in a shared storage space.

12. The electronic device according to claim 8, wherein determining the transmission paths of data among the processing tasks according to the content of the execution element of each processing task, comprises:
  acquiring a merge instruction from an execution element of a third processing task, and acquiring source channel information of at least two read sources corresponding to the merge instruction, and recording the source channel information;
  acquiring a write instruction from an execution element of a fourth processing task, and acquiring destination channel information of corresponding to the write instruction, and recording the destination channel information;

matching the recorded source channel information with the destination channel information; and in response to determining that the recorded source channel information matches with the destination channel information, determining that the transmission path of data is from the fourth processing task to the third processing task.

13. The electronic device according to claim 8, wherein, after determining the topological relation of the processing tasks, the method further comprises:

scheduling and executing the processing tasks according to the topological relation of the processing tasks, and recording execution parameters of the processing tasks; and analyzing performance of the topological relation according to the execution parameters.

14. The electronic device according to claim 13, wherein recording the execution parameters of the processing tasks comprises at least one of:

acquiring a duration between a startup time of an initial task node and an end time of a termination task node during executing process of the processing tasks as an execution parameter; and during the executing process, acquiring a transmission delay between a write time point of writing data to a channel space and a read time point of reading the data from the channel space among serial processing tasks, and taking the transmission delay as an execution parameter.

15. A non-transitory computer readable storage medium having computer programs stored thereon, wherein when the programs are executed by a processor, a method for processing topological relation of tasks is implemented, the method comprising:

extracting at least one execution element from each of processing tasks based on a topological relation recognition rule;

determining a dependency relation among the processing tasks according to content of the execution element of each processing task; and determining a topological relation of the processing tasks according to the dependency relation among the processing tasks, wherein determining the transmission paths of data among the processing tasks according to the content of the execution element of each processing task, comprises:

acquiring a read instruction from an execution element of a first processing task, acquiring source channel information of a read source corresponding to the read instruction, and recording the source channel information;

acquiring a write instruction from an execution element of a second processing task, acquiring destination channel information of a write destination corresponding to the write instruction, and recording the destination channel information;

matching the recorded source channel information with the destination channel information; and in response to determining that the recorded source channel information matches with the destination channel information, determining that the transmission path of data is from the second processing task to the first processing task.

16. The non-transitory computer readable storage medium according to claim 15, wherein determining the dependency relation among the processing tasks according to the content of the execution element of each processing task, comprises:

determining transmission paths of data among the processing tasks according to the content of the execution element of each processing task; and determining the dependency relation among the processing tasks according to the directions of the transmission paths.

17. The non-transitory computer readable storage medium according to claim 15, wherein the execution element comprises at least one of: a read instruction, a write instruction, a merging instruction and channel information.

18. The non-transitory computer readable storage medium according to claim 17, wherein the channel information is an address in a shared storage space.

* * * * *